(12) United States Patent
Judzis, Jr. et al.

(10) Patent No.: US 7,320,745 B2
(45) Date of Patent: Jan. 22, 2008

(54) ENERGY EFFICIENT METHOD FOR EXOTHERMIC REACTIONS

(75) Inventors: Arvids Judzis, Jr., Houston, TX (US); Abraham P. Gelbein, Falls Church, VA (US); John R. Adams, Houston, TX (US); Christopher C. Boyer, Houston, TX (US)

(73) Assignee: Catalytic Distillation Technologies, Pasadena, TX (US)

( * ) Notice: Subject to any disclaimer, the term of this patent is extended or adjusted under 35 U.S.C. 154(b) by 268 days.

(21) Appl. No.: 11/038,755

(22) Filed: Jan. 19, 2005

(65) Prior Publication Data
US 2006/0157337 A1    Jul. 20, 2006

(51) Int. Cl.
*B01D 3/14* (2006.01)
*C10G 7/00* (2006.01)

(52) U.S. Cl. .............. 203/21; 203/22; 203/27; 203/29; 203/98; 203/DIG. 8; 208/353; 208/355; 208/365; 585/8; 585/13; 585/804; 585/914

(58) Field of Classification Search .......... 203/21, 203/22, 27, 29, 98, DIG. 8, DIG. 6; 208/353, 208/355, 365; 585/8, 11, 13, 914, 804, 511
See application file for complete search history.

(56) References Cited

U.S. PATENT DOCUMENTS

| | | | |
|---|---|---|---|
| 2,373,501 A | 4/1945 | Peterson | 260/667 |
| 3,121,124 A | 2/1964 | Verdol | 260/677 |
| 3,304,338 A | 2/1967 | Parish | 260/667 |
| 3,629,478 A | 12/1971 | Haunschild | 260/677 A |
| 3,634,534 A | 1/1972 | Haunschild | 260/677 A |
| 3,825,603 A | 7/1974 | Massie | 260/612 D |
| 3,846,088 A | 11/1974 | Brown et al. | 44/56 |
| 4,008,290 A * | 2/1977 | Ward | 585/314 |
| 4,071,567 A | 1/1978 | Ancillotti et al. | 260/614 A |
| 4,198,530 A | 4/1980 | Wentzheimer et al. | 568/697 |
| 4,215,011 A | 7/1980 | Smith, Jr. | 252/426 |
| 4,232,177 A | 11/1980 | Smith, Jr. | 585/324 |

(Continued)

FOREIGN PATENT DOCUMENTS

CA        929537       7/1973

OTHER PUBLICATIONS

Derrien et al., The IFP Selective Hydrogenation Process, "Chemical Engineering Progress," vol. 70, No. 1, Jun. 1974, pp. 74-80.

(Continued)

*Primary Examiner*—Virginia Mancharan
(74) *Attorney, Agent, or Firm*—Osha Liang LLP

(57) ABSTRACT

An energy efficient process scheme for a highly exothermic reaction-distillation system in which the reactor is external to the distillation column and the feed to the reactor is a mixture of at least one liquid product stream from the distillation column with or without other liquid/vapor reactants. The reactor is operated under adiabatic and boiling point conditions and at a pressure that results in vaporizing a portion of the liquid flow through the reactor due to the heat of reaction. Under these conditions, reaction temperature is controlled by reactor pressure. The pressure (and hence the temperature) is maintained at a sufficiently high level such that the reactor effluent can be efficiently used to provide reboil heat for the distillation column.

4 Claims, 1 Drawing Sheet

U.S. PATENT DOCUMENTS

| | | | |
|---|---|---|---|
| 4,242,530 A | 12/1980 | Smith, Jr. | 585/510 |
| 4,250,052 A | 2/1981 | Smith, Jr. | 252/426 |
| 4,302,356 A | 11/1981 | Smith, Jr. | 252/426 |
| 4,307,254 A | 12/1981 | Smith, Jr. | 568/697 |
| 4,336,407 A | 6/1982 | Smith, Jr. | 568/697 |
| 4,450,311 A * | 5/1984 | Wright et al. | 585/413 |
| 4,504,687 A | 3/1985 | Jones, Jr. | 568/697 |
| 4,587,370 A * | 5/1986 | DeGraff | 585/450 |
| 4,695,665 A * | 9/1987 | De Graff | 585/450 |
| 4,885,424 A * | 12/1989 | Ferk et al. | 585/450 |
| 4,950,803 A | 8/1990 | Smith, Jr. et al. | 568/697 |
| 5,003,124 A | 3/1991 | Smith, Jr. et al. | 585/526 |
| 5,189,233 A | 2/1993 | Larkin et al. | 585/265 |
| 5,190,730 A | 3/1993 | Smith, Jr. et al. | 422/109 |
| 5,221,441 A | 6/1993 | Smith, Jr. et al. | 203/29 |
| 5,248,836 A | 9/1993 | Bakshi et al. | 568/697 |
| 5,248,837 A | 9/1993 | Smith, Jr. et al. | 568/697 |
| 5,336,821 A * | 8/1994 | DeGraff et al. | 585/402 |
| 5,792,428 A | 8/1998 | Bakshi et al. | 422/112 |
| 5,840,259 A | 11/1998 | Adams | 422/191 |

OTHER PUBLICATIONS

Harold W. Sheeline et al., Process Economics Reviews, Methyl Tertiary-Butyl Ether, SRI International.

Harold W. Scheeline et al., Process Economics Reviews, Methyl Tertiary-Butyl Ether, SRI International, circulating copy, report No. 78-1-3, Dec. 1978.

* cited by examiner

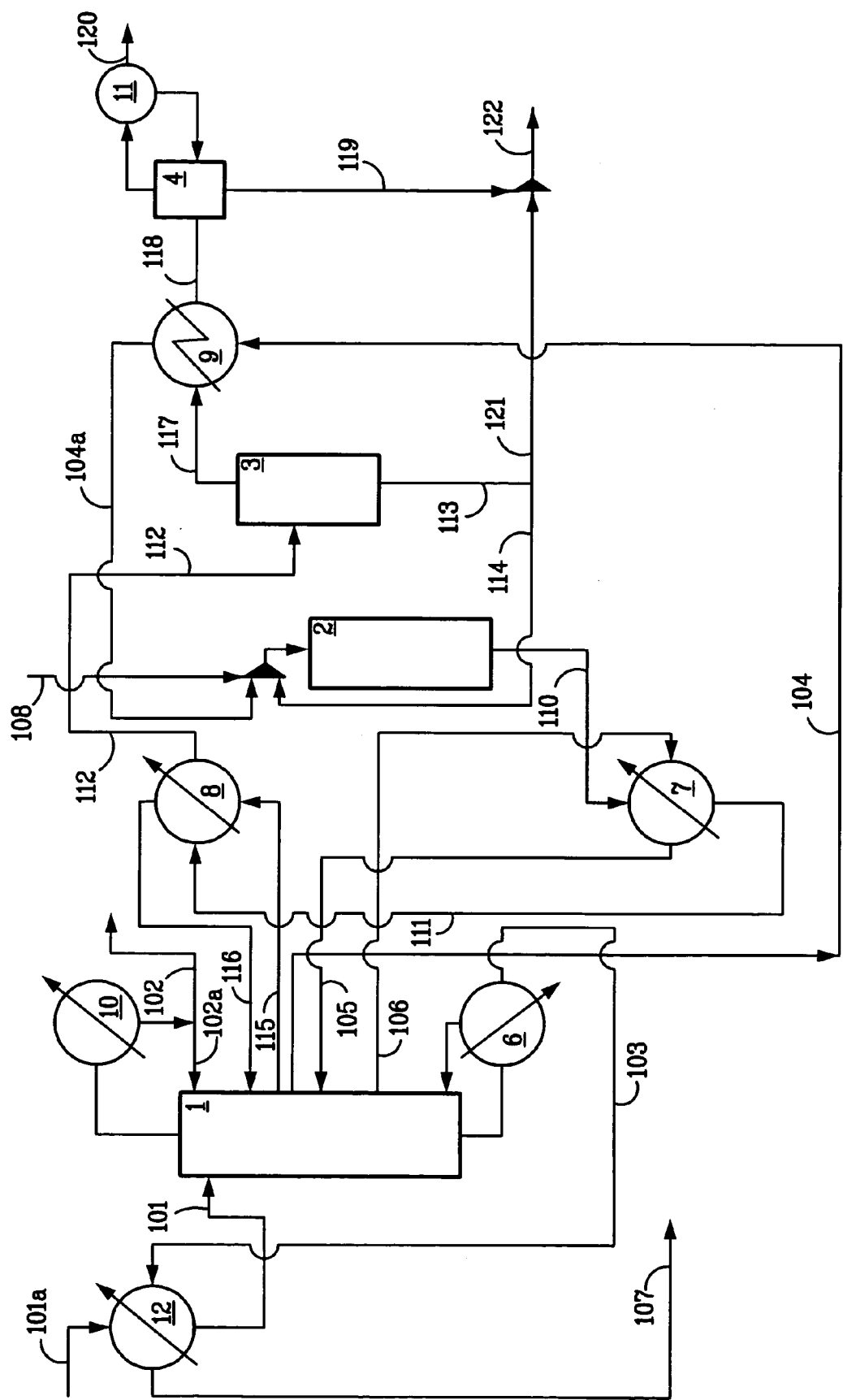

ENERGY EFFICIENT METHOD FOR EXOTHERMIC REACTIONS

BACKGROUND OF THE INVENTION

1. Field of the Invention

The present invention relates to a distillation-reaction system wherein a portion of the heat of reaction is recovered and used to operate the distillation.

2. Related Information

In combined reaction/distillation systems, such as the catalytic distillation system, where the catalyst is present in a form suitable to serve as a distillation structure; the heat of reaction generated in the reaction zone is utilized to reduce the energy requirement of the distillation process, i.e., reboiler duty. This is indeed the case when the key separations occur in staging within and above the reaction zone. On the other hand if key separations occur in staging below the reaction zone, heat of reaction does not reduce the heat duty to the column but simply increases condenser cooling duty.

An advantage of this invention is a flexible and efficient method that makes use of the heat of reaction to reduce reboiler duty in reaction-distillation systems in which the key separation occurs prior to reaction.

SUMMARY OF THE INVENTION

Briefly the present invention is a method to recover the heat of reaction of a reaction component from a petroleum stream to assist in fractionating the petroleum stream to remove and recover the reaction component.

The present invention includes the process for recovering the heat of reaction of a reaction component from a multi component petroleum stream to assist in fractional distillation of the multi component petroleum stream from which the reaction component is derived comprising: fractionating said multi component petroleum to recover at least two fractions, a first fraction containing said reaction component having a first boiling range and comprising less than the entire multi component petroleum stream, and a second fraction having a second boiling point which is lower than the first boiling range; removing said first fraction from said fractional distillation; reacting said reaction component under conditions to exothermically react said reaction component and produce a reaction stream having a third temperature higher than said second temperature range; removing said second fraction from said fractional distillation; heating said second fraction by indirect heat exchange with said reaction stream, to heat said second fraction and returning the second fraction to fractional distillation.

Preferably there are at least two fractions having a boiling range less than said first fraction, which are removed from the fractional distillation and heated by indirect contact with said reaction stream. Preferably the highest boiling range fraction other than said first fraction removed from the fractional distillation is first contacted with said reaction stream and each fraction other than said first fraction is contacted indirectly with said reaction stream in order of their descending boiling range and thereafter returned to the fractional distillation.

BRIEF DESCRIPTION OF THE DRAWING

The drawing is a schematic representation of a generalized implementation of the energy recovery process of the present invention.

DETAILED DESCRIPTION

The invention provides an energy efficient process scheme for a highly exothermic distillation reaction system wherein the reactor is external to the distillation column and wherein feed to the reactor comprises a mixture of at least one liquid product stream from the distillation column. The reactor is operated under adiabatic and boiling point conditions and at a pressure that results in vaporizing a portion of the liquid flow through the reactor due to the heat of reaction. Under these conditions reaction temperature is controlled by reactor pressure. The invention contemplates that the pressure (and hence the temperature) will be maintained at a sufficiently high level such that the reactor effluent can be efficiently used to provide reboil heat for the distillation column. In one embodiment of the invention the reactor operates in plug down flow mode, reactor effluent is routed to a column side reboiler, and heat utilization is accomplished by maintaining the reactor pressure at a higher level than the distillation column such that the reactor effluent dew point temperature range is higher than the distillation column reboiler temperature.

Following are examples of industrial processes that would benefit from one or more aspects of this invention, wherein the feed to reaction is derived from a prior fractional distillation:

reduction of benzene content in reformate streams slated for motor gasoline use by converting the benzene to cyclohexane via hydrogenation;

cyclohexane via hydrogenation of benzene;

aniline via hydrogenation of nitrobenzene;

aromatics alkylation, e.g., ethylbenzene, cumene, butyl benzene;

oxidation systems, e.g., vinylacetate via ethylene/02/acetic acid; and hydroformylation systems, e.g., Fischer-Tropsch products; methanol via $CO/H_2$.

The figure is a generalized implementation of a process for converting a compound A contained in a feed stream with lighter and heavier components with a compound B to form a product C in an exothermic reaction in reactor 2. The overall process scheme consists of distillation column 1; reaction zone 2; liquid-vapor separators 3, 4; reboilers 6, 7, 8; heater 9; condensers 10, 11; feed/effluent exchanger 12. Heat sources for reboiler 6 may be steam, hot oil, or process heaters. Heat sink for condensers 10 and 11 may be cooling water or air. Heat sources for the remaining heat exchangers are obtained from the heat of reaction as described below.

Feed stream 101*a* to the distillation column is a multi-component petroleum which is comprised of heavy-end components, intermediate boiling range components including compound A, light boiling range components, and light end components. The column 1, configured with mass transfer stages above and below the feed point, is designed to split the feed into its light boiling range components in stream 102, intermediate range components including essentially all of compound A in stream 104 which is withdrawn from the column several stages above the feed stage, and heavy end components in stream 103. This is accomplished by providing sufficient stages above and below the feed stage and heat input to reboilers 6, 7, and 8. The heavy-end product stream 107 is obtained after cooling stream 103 by heat exchange with feed stream 101*a*.

Reactor 2 is an adiabatic boiling point reactor containing catalyst that promotes the desired reaction. Feed to the reactor includes stream 104 (via heater 9), stream 108 containing compound B, and recycle stream 114 generated as noted below. Stream 104 enriched in compound A and essentially free of heavy-end components is withdrawn from several stages above the feed stage. Stream 108 can be either vapor or liquid. The reactor 2 is configured as a typical fixed bed reactor operating up-flow or down-flow or in a preferred embodiment as a down-flow reactor containing catalyst supported within a mass transfer structure.

Heat is generated in the reactor due to the heat of reaction. Since the reactor is operating under adiabatic and boiling point conditions, a portion of the liquid phase flowing through the reactor vaporizes in an amount corresponding to the heat of reaction and latent heat of vaporization. In one aspect of the invention, sufficient liquid flow to the reactor is provided so that the reactor effluent, stream 110, comprises both liquid and vapor phases. This is accomplished by adjusting the flow of recycle stream 114 and the pressure of reactor 2.

In one aspect of the invention, stream 110 is routed to the hot side inlet of reboiler 7 where it is heat exchanged against side draw stream 106 fed to the cold inlet side of reboiler 7. Hot and cold side exit streams are streams 111 and 105 respectively. In another aspect of the invention, reactor 2 operates at a higher pressure than column 1 such that the temperature of stream 111 is higher than the bubble point of stream 106. Under this condition, a portion of the sensible and latent heat in stream 110 go to boil stream 106 producing vapor stream 105 which is fed back into column 1. In another aspect of the invention the difference in operating pressure between reactor 2 and column 1 is adjusted such that the resulting temperatures of the feed and effluent streams provide at least a two degree Fahrenheit temperature approach at either the inlet or outlet sides of reboiler 7.

In another aspect of the invention stream 111 is optionally routed to the hot side inlet of reboiler 8 which provides a portion of the reboiler duty to the light-intermediate component section of column 1. Cold side inlet is stream 115 drawn from the feed stage. Cold side exit is vapor stream 116 returned to column 1 above the draw stage.

Hot side exit stream 112 is fed to vapor-liquid separation vessel 3 producing vapor stream 117 and liquid stream 113. Stream 113 is split into recycle stream 114 and product stream 121 containing intermediate boiling range components including any unconverted compound A, reaction product compound C, and any condensable components in stream 102 including unconverted reactant B. Stream 114/stream 121 split ratio is an independent process variable which in conjunction with operating pressure of the reactor controls the temperature profile across the reactor as well as the vapor-liquid flow distribution. In a preferred embodiment of the invention the combination of reactor pressure and recycle stream flow is adjusted such that the reactor is operating in pulse flow mode (mass velocities of liquid and vapor generally >3000 lb/h/ft$^2$) and the corresponding temperature profile results in practical space yield, conversion and selectivity for reaction.

In still another aspect of the invention, remaining sensible and latent heat in stream 117 is optionally used to preheat stream 104 to stream 104a feed to reactor 2 by routing streams 104 and 117 to the cold and hot inlet sides respectively of heater 9. Stream 118 containing light non-condensing components that were either produced in the reactor or were contained in feed stream 108 is vapor/liquid separated in vessel 4. The vapor stream is further cooled in condenser 11 producing condensate stream 119 which is returned to vessel 4 and vent stream 120 comprising light end components that entered the system in stream 108 and any light end by-products produced in the reactor. The combination of streams 119 and 121 is the intermediate boiling range product stream 122 which contains product C.

Another aspect of the invention (configuration not shown) addresses the situation where the volatility of product component C is in the range of the heavy boiling range components. In this case stream 122 is fed back to column 1 to separate product C as a liquid bottoms product or as a vapor product drawn from a stage near the bottom of the column while intermediate boiling range components are recovered from the column together with light-end components in stream 102.

EXAMPLE 1

The following example demonstrates use of the invention for reducing the benzene content in a gasoline mixture containing $C_5$-$C_{10}$ paraffin and aromatic components. Equipment and stream names are as given in the figure. Compositions and stream flows are in Table 1.

Main reaction in reactor 2 is the following reaction catalyzed by a supported Ni catalyst:

Benzene+3 Hydrogen→cyclohexane

Reactor operating conditions are summarized in Table 2.

TABLE 2

| | |
|---|---|
| Pressure in | 250 psi |
| Pressure out | 245 psi |
| Temperature in | 223° F. |
| Temperature out | 358° F. |
| LHSV(based on total liquid feed) | 6.9 ft$^3$ liquid feed/hr/ft$^3$ reactor volume |
| Benzene/H2 mol ratio in feed | 3.51 |
| Mass flow liquid in | 10,850 lb/hr/ft$^2$ |
| Mass flow liquid out | 5,683 lb/hr/ft$^2$ |
| Mass flow vapor in | 1,832 lb/hr/ft$^2$ |
| Mass flow vapor out | 7,000 lb/hr/ft$^2$ |
| Benzene conversion across reactor | 99% |
| Reactor recycle mass ratio, stream 9/stream 15 | 2.36 |

Column 1 design parameters are summarized in Table 3. Separation requirements are less than 1 wt % toluene in stream 104 (to minimize toluene loss in reactor 2 by hydrogenation to methylcyclohexane) and benzene levels in streams 102 and 103 of less than 0.5 wt %.

TABLE 3

| | |
|---|---|
| Number of stages | 62 |
| Top pressure | 29 psi |
| Reflux mass ratio, reflux rate/distillate rate | 7.83 |
| Feed stream locations | |
| Stream 151 | Stage 37 |
| Stream 155 | Stage 57 |
| Stream 116 | Stage 26 |
| Draw stream locations | |
| Stream 153 | Stage 62 |
| Stream 115 | Stage 26 |
| Stream 156 | Stage 57 |
| Stream 152 | Stage 1 |
| Stream 154 | Stage 26 |
| Reboiler duties | |
| Reboiler 6 (external heat source) | 23 MM btu/hr |
| Reboiler 7 | 9.8 MM btu/hr |
| Reboiler 8 | 8.0 MM btu/hr |

The reboiler data in Table 3 demonstrate that practice of the invention reduces external heat load to the distillation column by 43.6% corresponding to use of 82% of the heat of reaction generated in the reactor.

TABLE 1

| | STREAM | | | | | | |
|---|---|---|---|---|---|---|---|
| | 101 | 101a | 102 | 103 | 104 | 104a | 105 |
| Temperature F. | 257 | 176 | 123 | 312 | 201 | 254 | 356 |
| Pressure psi | 145 | 145 | 29 | 31 | 30 | 250 | 40 |
| Mass Flow lb/hr | | | | | | | |
| H2 | 0 | 0 | 0 | 0 | 0 | 0 | 0 |
| Methane | 0 | 0 | 0 | 0 | 0 | 0 | 0 |
| Ethane | 0 | 0 | 0 | 0 | 0 | 0 | 0 |
| Propane | 0 | 0 | 0 | 0 | 0 | 0 | 0 |
| I-Butane | 799 | 799 | 777 | 0 | 23 | 23 | 0 |
| N-Butane | 1865 | 1865 | 1794 | 0 | 71 | 71 | 0 |
| I-C5 | 11721 | 11721 | 10730 | 0 | 991 | 991 | 0 |
| N-C5 | 8258 | 8258 | 7398 | 0 | 860 | 860 | 0 |
| 2,2 Dimethylbutane | 1865 | 1865 | 1476 | 0 | 389 | 389 | 0 |
| 2,3-Dimethylbutane | 2131 | 2131 | 1328 | 0 | 803 | 803 | 0 |
| Cycpentane | 0 | 0 | 0 | 0 | 0 | 0 | 0 |
| Cycpentene | 266 | 266 | 226 | 0 | 41 | 41 | 0 |
| 1-Pentene | 266 | 266 | 242 | 0 | 25 | 25 | 0 |
| 2-Methylpentane | 7459 | 7459 | 3890 | 0 | 3569 | 3569 | 0 |
| 3-Methylpentane | 6127 | 6127 | 1552 | 0 | 4575 | 4575 | 0 |
| N-Hexane | 7459 | 7459 | 146 | 0 | 7313 | 7313 | 1 |
| 1-Hexene | 266 | 266 | 73 | 0 | 193 | 193 | 0 |
| Cychexene | 533 | 533 | 0 | 81 | 452 | 452 | 102 |
| Cychexane | 0 | 0 | 0 | 0 | 0 | 0 | 0 |
| 2,2-Dimethylpentane | 799 | 799 | 0 | 0 | 796 | 796 | 7 |
| Methylcyclopentane | 1066 | 1066 | 5 | 1 | 1060 | 1060 | 3 |
| 2-4-Dimethylpentane | 799 | 799 | 0 | 0 | 796 | 796 | 9 |
| Benzene | 18647 | 18647 | 31 | 411 | 18206 | 18206 | 714 |
| 3,3-Dimethylpentane | 799 | 799 | 0 | 172 | 627 | 627 | 216 |
| 2-Methylhexane | 4529 | 4529 | 0 | 1306 | 3223 | 3223 | 1606 |
| 2,3-Dimethylpentane | 1865 | 1865 | 0 | 765 | 1100 | 1100 | 810 |
| 3-Ethylpentane | 799 | 799 | 0 | 493 | 306 | 306 | 429 |
| 3-Methylhexane | 5861 | 5861 | 0 | 2744 | 3117 | 3117 | 2819 |
| T-1,3-Dimethylcyclohexane | 533 | 533 | 0 | 347 | 185 | 185 | 271 |
| T-1,2-Dimethylcycloxexane | 533 | 533 | 0 | 350 | 183 | 183 | 271 |
| N-Heptane | 5328 | 5328 | 0 | 4267 | 1061 | 1061 | 3145 |
| Methylcychexane | 266 | 266 | 0 | 256 | 11 | 11 | 119 |
| 2-Methyl-1-Hexene | 533 | 533 | 0 | 277 | 256 | 256 | 267 |
| Ethylcyclopentane | 799 | 799 | 0 | 767 | 32 | 32 | 362 |
| 2,5-Dimethylhexane | 266 | 266 | 0 | 261 | 6 | 6 | 131 |
| 2,4-Dimethylhexane | 533 | 533 | 0 | 524 | 9 | 9 | 250 |
| Toluene | 63934 | 63934 | 0 | 63511 | 423 | 423 | 23557 |
| 2-Methylheptane | 1332 | 1332 | 0 | 1032 | 300 | 300 | 767 |
| 3-Methylheptane | 266 | 266 | 0 | 266 | 0 | 0 | 95 |
| 4-Methylheptane | 799 | 799 | 0 | 798 | 1 | 1 | 295 |
| N-Octane | 1332 | 1332 | 0 | 1332 | 0 | 0 | 413 |
| Ethylbenzene | 9057 | 9057 | 0 | 9057 | 0 | 0 | 2263 |
| M-xylene | 26639 | 26639 | 0 | 26639 | 0 | 0 | 6473 |
| P-Xylene | 10656 | 10656 | 0 | 10656 | 0 | 0 | 2602 |
| O-Xylene | 14652 | 14652 | 0 | 14652 | 0 | 0 | 3418 |
| C-1,3-Dimethylcyclohexane | 266 | 266 | 0 | 266 | 0 | 0 | 84 |
| Nonane | 533 | 533 | 0 | 533 | 0 | 0 | 123 |
| Tetramethylbenzene | 37295 | 37295 | 0 | 37295 | 0 | 0 | 7023 |
| Decane | 6660 | 6660 | 0 | 6660 | 0 | 0 | 1355 |
| Undecane | 0 | 0 | 0 | 0 | 0 | 0 | 0 |
| N-Pentylbenzene | 0 | 0 | 0 | 0 | 0 | 0 | 0 |

| | STREAM | | | | | | |
|---|---|---|---|---|---|---|---|
| | 106 | 107 | 108 | 109 | 110 | 111 | 112 |
| Temperature F. | 290 | 194 | 86 | 223 | 359 | 320 | 268 |
| Pressure psi | 31 | 31 | 250 | 250 | 245 | 245 | 245 |
| Mass Flow lb/hr | | | | | | | |
| H2 | 0 | 0 | 1649 | 1660 | 251 | 251 | 251 |
| Methane | 0 | 0 | 1680 | 1952 | 1952 | 1952 | 1952 |
| Ethane | 0 | 0 | 1889 | 2626 | 2626 | 2626 | 2626 |
| Propane | 0 | 0 | 1709 | 2878 | 2878 | 2878 | 2878 |
| I-Butane | 0 | 0 | 0 | 44 | 44 | 44 | 44 |
| N-Butane | 0 | 0 | 791 | 1784 | 1784 | 1784 | 1784 |
| I-C5 | 0 | 0 | 378 | 3243 | 3243 | 3243 | 3243 |
| N-C5 | 0 | 0 | 302 | 2843 | 2843 | 2843 | 2843 |
| 2,2 Dimethylbutane | 0 | 0 | 0 | 1015 | 1015 | 1015 | 1015 |
| 2,3-Dimethylbutane | 0 | 0 | 0 | 2159 | 2159 | 2159 | 2159 |
| Cycpentane | 0 | 0 | 0 | 0 | 0 | 0 | 0 |

TABLE 1-continued

| | | | | | | | |
|---|---|---|---|---|---|---|---|
| Cycpentene | 0 | 0 | 0 | 103 | 103 | 103 | 103 |
| 1-Pentene | 0 | 0 | 0 | 59 | 59 | 59 | 59 |
| 2-Methylpentane | 0 | 0 | 0 | 9632 | 9632 | 9632 | 9632 |
| 3-Methylpentane | 0 | 0 | 0 | 12489 | 12489 | 12489 | 12489 |
| N-Hexane | 1 | 0 | 0 | 20312 | 20312 | 20312 | 20312 |
| 1-Hexene | 0 | 0 | 0 | 526 | 526 | 526 | 526 |
| Cychexene | 102 | 81 | 0 | 1302 | 1302 | 1302 | 1302 |
| Cychexane | 0 | 0 | 0 | 36946 | 56567 | 56567 | 56567 |
| 2,2-Dimethylpentane | 7 | 3 | 0 | 2281 | 2281 | 2281 | 2281 |
| Methylcyclopentane | 3 | 1 | 0 | 2976 | 2976 | 2976 | 2976 |
| 2-4-Dimethylpentane | 9 | 4 | 0 | 2283 | 2283 | 2283 | 2283 |
| Benzene | 714 | 411 | 0 | 18206 | 0 | 0 | 0 |
| 3,3-Dimethylpentane | 216 | 172 | 0 | 1835 | 1835 | 1835 | 1835 |
| 2-Methylhexane | 1606 | 1306 | 0 | 9475 | 9475 | 9475 | 9475 |
| 2,3-Dimethylpentane | 810 | 765 | 0 | 3241 | 3241 | 3241 | 3241 |
| 3-Ethylpentane | 429 | 493 | 0 | 908 | 908 | 908 | 908 |
| 3-Methylhexane | 2819 | 2744 | 0 | 9212 | 9212 | 9212 | 9212 |
| T-1,3-Dimethylcyclohexane | 271 | 347 | 0 | 549 | 549 | 549 | 549 |
| T-1,2-Dimethylcycloxexane | 271 | 350 | 0 | 543 | 543 | 543 | 543 |
| N-Heptane | 3145 | 4267 | 0 | 3183 | 3183 | 3183 | 3183 |
| Methylcychexane | 119 | 256 | 0 | 33 | 33 | 33 | 33 |
| 2-Methyl-1-Hexene | 267 | 277 | 0 | 756 | 756 | 756 | 756 |
| Ethylcyclopentane | 362 | 767 | 0 | 97 | 97 | 97 | 97 |
| 2,5-Dimethylhexane | 131 | 261 | 0 | 18 | 18 | 18 | 18 |
| 2,4-Dimethylhexane | 250 | 524 | 0 | 27 | 27 | 27 | 27 |
| Toluene | 23557 | 63511 | 0 | 1297 | 1297 | 1297 | 1297 |
| 2-Methylheptane | 767 | 1032 | 0 | 902 | 902 | 902 | 902 |
| 3-Methylheptane | 95 | 266 | 0 | 1 | 1 | 1 | 1 |
| 4-Methylheptane | 295 | 798 | 0 | 3 | 3 | 3 | 3 |
| N-Octane | 413 | 1332 | 0 | 0 | 0 | 0 | 0 |
| Ethylbenzene | 2263 | 9057 | 0 | 0 | 0 | 0 | 0 |
| M-xylene | 6473 | 26639 | 0 | 0 | 0 | 0 | 0 |
| P-Xylene | 2602 | 10656 | 0 | 0 | 0 | 0 | 0 |
| O-Xylene | 3418 | 14652 | 0 | 0 | 0 | 0 | 0 |
| C-1,3-Dimethylcyclohexane | 84 | 266 | 0 | 0 | 0 | 0 | 0 |
| Nonane | 123 | 533 | 0 | 0 | 0 | 0 | 0 |
| Tetramethylbenzene | 7023 | 37295 | 0 | 0 | 0 | 0 | 0 |
| Decane | 1355 | 6660 | 0 | 0 | 0 | 0 | 0 |
| Undecane | 0 | 0 | 0 | 0 | 0 | 0 | 0 |
| N-Pentylbenzene | 0 | 0 | 0 | 0 | 0 | 0 | 0 |

| | STREAM | | | | |
|---|---|---|---|---|---|
| | 113 | 114 | 115 | 116 | 117 |
| Temperature F. | 268 | 268 | 201 | 212 | 204 |
| Pressure psi | 244 | 244 | 30 | 30 | 250 |
| Mass Flow lb/hr | | | | | |
| H2 | 17 | 12 | 0 | 0 | 0 |
| Methane | 388 | 272 | 0 | 0 | 0 |
| Ethane | 1051 | 736 | 0 | 0 | 0 |
| Propane | 1668 | 1169 | 0 | 0 | 0 |
| I-Butane | 31 | 22 | 28 | 28 | 23 |
| N-Butane | 1316 | 922 | 88 | 88 | 71 |
| I-C5 | 2674 | 1874 | 1224 | 1224 | 991 |
| N-C5 | 2399 | 1681 | 1062 | 1062 | 860 |
| 2,2 Dimethylbutane | 894 | 626 | 475 | 475 | 389 |
| 2,3-Dimethylbutane | 1935 | 1356 | 956 | 956 | 803 |
| Cycpentane | 0 | 0 | 0 | 0 | 0 |
| Cycpentene | 89 | 62 | 50 | 50 | 41 |
| 1-Pentene | 49 | 34 | 30 | 30 | 25 |
| 2-Methylpentane | 8653 | 6063 | 4179 | 4179 | 3569 |
| 3-Methylpentane | 11296 | 7915 | 5285 | 5285 | 4575 |
| N-Hexane | 18552 | 12999 | 8581 | 8581 | 7313 |
| 1-Hexene | 476 | 333 | 223 | 223 | 193 |
| Cychexene | 1213 | 850 | 490 | 490 | 452 |
| Cychexane | 52730 | 36946 | 0 | 0 | 0 |
| 2,2-Dimethylpentane | 2119 | 1484 | 934 | 934 | 796 |
| Methylcyclopentane | 2735 | 1916 | 1244 | 1244 | 1060 |
| 2-4-Dimethylpentane | 2123 | 1487 | 932 | 932 | 796 |
| Benzene | 0 | 0 | 20863 | 20863 | 18206 |
| 3,3-Dimethylpentane | 1723 | 1208 | 696 | 696 | 627 |
| 2-Methylhexane | 8923 | 6252 | 3621 | 3621 | 3223 |
| 2,3-Dimethylpentane | 3056 | 2141 | 1262 | 1262 | 1100 |
| 3-Ethylpentane | 860 | 602 | 385 | 385 | 306 |
| 3-Methylhexane | 8699 | 6095 | 3665 | 3665 | 3117 |
| T-1,3-Dimethylcyclohexane | 519 | 364 | 231 | 231 | 185 |
| T-1,2-Dimethylcycloxexane | 514 | 360 | 229 | 229 | 183 |

TABLE 1-continued

| | | | | | |
|---|---|---|---|---|---|
| N-Heptane | 3029 | 2122 | 1569 | 1569 | 1061 |
| Methylcychexane | 31 | 22 | 19 | 19 | 11 |
| 2-Methyl-1-Hexene | 715 | 501 | 306 | 306 | 256 |
| Ethylcyclopentane | 92 | 65 | 58 | 58 | 32 |
| 2,5-Dimethylhexane | 17 | 12 | 12 | 12 | 6 |
| 2,4-Dimethylhexane | 26 | 18 | 19 | 19 | 9 |
| Toluene | 1247 | 874 | 837 | 837 | 423 |
| 2-Methylheptane | 859 | 602 | 439 | 439 | 300 |
| 3-Methylheptane | 1 | 0 | 1 | 1 | 0 |
| 4-Methylheptane | 3 | 2 | 2 | 2 | 1 |
| N-Octane | 0 | 0 | 0 | 0 | 0 |
| Ethylbenzene | 0 | 0 | 0 | 0 | 0 |
| M-xylene | 0 | 0 | 0 | 0 | 0 |
| P-Xylene | 0 | 0 | 0 | 0 | 0 |
| O-Xylene | 0 | 0 | 0 | 0 | 0 |
| C-1,3-Dimethylcyclohexane | 0 | 0 | 0 | 0 | 0 |
| Nonane | 0 | 0 | 0 | 0 | 0 |
| Tetramethylbenzene | 0 | 0 | 0 | 0 | 0 |
| Decane | 0 | 0 | 0 | 0 | 0 |
| Undecane | 0 | 0 | 0 | 0 | 0 |
| N-Pentylbenzene | 0 | 0 | 0 | 0 | 0 |

| | STREAM | | | | |
|---|---|---|---|---|---|
| | 118 | 119 | 120 | 121 | 122 |
| Temperature F. | 254 | 105 | 105 | 268 | 234 |
| Pressure psi | 250 | 244 | 244 | 244 | 244 |
| Mass Flow lb/hr | | | | | |
| H2 | 0 | 1 | 232 | 5 | 6 |
| Methane | 0 | 64 | 1500 | 116 | 180 |
| Ethane | 0 | 276 | 1299 | 315 | 590 |
| Propane | 0 | 486 | 723 | 499 | 986 |
| I-Butane | 23 | 8 | 5 | 9 | 17 |
| N-Butane | 71 | 317 | 151 | 394 | 711 |
| I-C5 | 991 | 468 | 100 | 801 | 1269 |
| N-C5 | 860 | 381 | 63 | 718 | 1099 |
| 2,2 Dimethylbutane | 389 | 109 | 12 | 268 | 377 |
| 2,3-Dimethylbutane | 803 | 207 | 17 | 579 | 786 |
| Cycpentane | 0 | 0 | 0 | 0 | 0 |
| Cycpentene | 41 | 13 | 2 | 27 | 39 |
| 1-Pentene | 25 | 8 | 2 | 15 | 23 |
| 2-Methylpentane | 3569 | 910 | 69 | 2590 | 3500 |
| 3-Methylpentane | 4575 | 1117 | 77 | 3381 | 4498 |
| N-Hexane | 7313 | 1666 | 93 | 5553 | 7220 |
| 1-Hexene | 193 | 48 | 3 | 142 | 190 |
| Cychexene | 452 | 86 | 3 | 363 | 449 |
| Cychexane | 0 | 3688 | 149 | 15784 | 19472 |
| 2,2-Dimethylpentane | 796 | 156 | 7 | 634 | 790 |
| Methylcyclopentane | 1060 | 229 | 12 | 819 | 1047 |
| 2-4-Dimethylpentane | 796 | 154 | 6 | 635 | 789 |
| Benzene | 18206 | 0 | 0 | 0 | 0 |
| 3,3-Dimethylpentane | 627 | 108 | 4 | 516 | 624 |
| 2-Methylhexane | 3223 | 537 | 15 | 2671 | 3208 |
| 2,3-Dimethylpentane | 1100 | 180 | 5 | 915 | 1095 |
| 3-Ethylpentane | 306 | 47 | 1 | 257 | 304 |
| 3-Methylhexane | 3117 | 500 | 13 | 2604 | 3103 |
| T-1,3-Dimethylcyclohexane | 185 | 29 | 1 | 155 | 185 |
| T-1,2-Dimethylcycloxexane | 183 | 29 | 1 | 154 | 183 |
| N-Heptane | 1061 | 151 | 3 | 907 | 1058 |
| Methylcychexane | 11 | 1 | 0 | 9 | 11 |
| 2-Methyl-1-Hexene | 256 | 41 | 1 | 214 | 255 |
| Ethylcyclopentane | 32 | 4 | 0 | 28 | 32 |
| 2,5-Dimethylhexane | 6 | 1 | 0 | 5 | 6 |
| 2,4-Dimethylhexane | 9 | 1 | 0 | 8 | 9 |
| Toluene | 423 | 49 | 1 | 373 | 422 |
| 2-Methylheptane | 300 | 42 | 1 | 257 | 299 |
| 3-Methylheptane | 0 | 0 | 0 | 0 | 0 |
| 4-Methylheptane | 1 | 0 | 0 | 1 | 1 |
| N-Octane | 0 | 0 | 0 | 0 | 0 |
| Ethylbenzene | 0 | 0 | 0 | 0 | 0 |
| M-xylene | 0 | 0 | 0 | 0 | 0 |
| P-Xylene | 0 | 0 | 0 | 0 | 0 |
| O-Xylene | 0 | 0 | 0 | 0 | 0 |
| C-1,3-Dimethylcyclohexane | 0 | 0 | 0 | 0 | 0 |
| Nonane | 0 | 0 | 0 | 0 | 0 |
| Tetramethylbenzene | 0 | 0 | 0 | 0 | 0 |
| Decane | 0 | 0 | 0 | 0 | 0 |

TABLE 1-continued

| | | | | | |
|---|---|---|---|---|---|
| Undecane | 0 | 0 | 0 | 0 | 0 |
| N-Pentylbenzene | 0 | 0 | 0 | 0 | 0 |

EXAMPLE 2

Structured Catalyst Packing

The reactor was configured to behave as a down flow, plug flow reactor. This run used a single pass with 10% benzene in cyclohexane feed through the column filled with 1.09 lbs of dispersed nickel catalyst (KL-6564-T1.2) prepared in modules described in U.S. Pat. No. 5,431,890. The feed system was limited to a mamximum flow rate of 16 lb/hr. The differential pressure meter indicated nearly no pressure drop through the column.

Stoichiometric hydrogen flow is 14.6 scf per lb of benzene. During most of the run, the hydrogen to hydrocarbon feed ratio was kept at 2 scf $H_2$ per lb hydrocarbon, thus the hydrogen stoichiometry was 140%. The heat of reaction from the hydrogenation of one lb of benzene is six times higher than the latent heat of vaporization for cyclohexane in a weight basis; thus the maximum concentration of benzene to prevent complete vaporization would have been 17%.

Data from Run

| HC Rate lb/hr | H2 Rate scfh | Inlet T ° F. | Ave T ° F. | Exit T ° F. | Bz Conv % | H2 Conv % | WHSV $hr^{-1}$ | Index $psia^{-1}hr^{-1}$ |
|---|---|---|---|---|---|---|---|---|
| 2 | 8 | 250 | 320 | 300 | 99.8+ | 34% | 1.8 | 0.10 |
| 10 | 20 | 200 | 326 | 350 | 97% | 70% | 9.2 | 0.30 |
| 16 | 32 | 200 | 280 | 340 | 89% | 60% | 15 | 0.20 |

There was a stronger correlation between conversion and temperature than there was between flow rate and conversion. Higher temperature resulted in a higher kinetic rate constant at the same flow rate but also a lower hydrogen partial pressure. The maximum WHSV obtainable to maintain 97% conversion was about 9.

EXAMPLE 3

Dumped Catalyst

The column was loaded with 4.5 lbs (14 feet) of the catalyst of Example 2 in a dumped bed. The feed flow was 40 lb/hr of recycled cyclohexane and 10 lb/hr of 50% benzene in cyclohexane with 90 scfh of hydrogen. Complete conversion of the benzene to cyclohexane was obtained throughout the run. Hydrogen conversion was about 70%. Recycle can be used to increase the velocity through the reactor without having to make the reactor unusually long and thin. It also works to act as a heat sink for highly exothermic reactions, such as benzene hydrogenation, and will dilute the feed to a level that can be handled in the boiling point reactor described here. Recycle has limited applications because it dilutes the effectiveness of the reactor as well. Compared to a single pass, plug flow reactor, adding a recycle line where the recycle flow rate equals the feed flow rate (doubling the velocity), a kinetic improvement of 25% is required to achieve the same overall conversion.

The structured catalyst packing (Example 2) provides lower pressure drops in the reactor. A structured bed with a void fraction of 0.5 will have 4 times less pressure drop compared to a dumped bed with a void fraction of 0.3, and a structured bed with a void fraction of 0.6 will have 8 times less pressure drop. However, with structured packing, conversion was 97% at a WHSV of 9, whereas with dumped packing, 99+% conversion was obtained at a WHSV of 11 and higher. The apparent catalyst activity was three times higher in the dumped packing than in the structured packing, most likely due to improved mass transfer with higher flow velocity in the dumped packing, and increased bypassing in the dual void dimension of the structured packing.

Preferably the down flow boiling point reactor is operated in a pulse flow mode to take advantage of the improved hydraulic mixing. The operating conditions for entering pulse flow based on generalized flow maps suggest, at 200 psig and 340° F., the flow rates have to exceed 60 lb/hr of hydrocarbon liquid and 90 scfh of vapor in order to enter the pulse flow hydrodynamic regime.

The invention claimed is:

1. A process for recovering the heat of reaction of a reaction component from a multi component petroleum stream to assist in fractional distillation of the multi component petroleum stream from which the reaction component is derived comprising:

fractionating said multi component petroleum to recover at least two fractions, a first fraction containing said reaction component having a first boiling range and comprising less than the entire multi component petroleum stream, and a second fraction having a second boiling point which is lower than the first boiling range;

removing said first fraction from said fractional distillation;

reacting said reaction component under conditions to exothermically react said reaction component and produce a reaction stream having a temperature higher than said second boiling range;

removing said second fraction from said fractional distillation;

heating said second fraction by indirect heat exchange with said reaction stream; and returning the heated second fraction to said fractional distillation;
wherein said multi component petroleum feed comprises a gasoline mixture containing $C_5$-$C_{10}$ paraffin and aromatic components: benzene is said reaction component in said first fraction; said benzene is reacted with hydronen in a reaction mixture at the boiling point of said first fraction in plug flow in the presence of a hydrogenation catalyst under conditions of temperature and pressure to convert benzene to cyclohexane.

2. The process according to claim 1 wherein there are at least two fractions having a boiling range less than said first fraction, which are removed from the fractional distillation and heated by indirect contact with said reaction stream.

3. The process according to claim 1 wherein said catalyst is a dumped bed.

4. The process according to claim 1 wherein said catalyst is a bed of structured catalyst.

* * * * *